(12) United States Patent
Boyle

(10) Patent No.: US 12,110,067 B2
(45) Date of Patent: Oct. 8, 2024

(54) ELECTRIC COMMERCIAL VEHICLE POWER STEERING SYSTEM WITH A GLOBOIDAL WORMGEARING

(71) Applicant: ZF Friedrichshafen AG, Friedrichshafen (DE)

(72) Inventor: Kevin Boyle, Hermitage, TN (US)

(73) Assignee: ZF Friedrichshafen AG, Friedrichshafen (DE)

( * ) Notice: Subject to any disclaimer, the term of this patent is extended or adjusted under 35 U.S.C. 154(b) by 285 days.

(21) Appl. No.: 17/139,186

(22) Filed: Dec. 31, 2020

(65) Prior Publication Data
US 2022/0204072 A1    Jun. 30, 2022

(51) Int. Cl.
| | | |
|---|---|---|
| *B62D 5/04* | (2006.01) | |
| *B62D 7/18* | (2006.01) | |
| *B62D 7/20* | (2006.01) | |
| *F16C 19/36* | (2006.01) | |
| *F16H 37/02* | (2006.01) | |

(52) U.S. Cl.
CPC .............. *B62D 5/0454* (2013.01); *B62D 7/18* (2013.01); *B62D 7/20* (2013.01); *F16C 19/364* (2013.01); *F16H 37/02* (2013.01); *F16H 2702/02* (2013.01)

(58) Field of Classification Search
CPC .......... B62D 3/10; B62D 5/04; B62D 5/0412; B62D 5/0421; B62D 5/0454; F16H 2702/02
See application file for complete search history.

(56) References Cited

U.S. PATENT DOCUMENTS

| | | | | |
|---|---|---|---|---|
| 2,069,143 | A * | 1/1937 | Hammond, Jr. | B62D 3/04 384/255 |
| 5,433,294 | A * | 7/1995 | Walker | B66B 11/0446 187/254 |
| 2003/0137120 | A1* | 7/2003 | Thompson | F16C 11/0671 280/93.511 |
| 2004/0134300 | A1* | 7/2004 | Oberle | B62D 5/0409 280/775 |
| 2009/0032328 | A1* | 2/2009 | Wong | B62K 5/08 180/444 |

FOREIGN PATENT DOCUMENTS

| | | | |
|---|---|---|---|
| CN | 102039927 | * | 5/2011 |
| CN | 205836921 | * | 12/2016 |
| CN | 107187494 | * | 9/2017 |

* cited by examiner

*Primary Examiner* — William C Joyce
(74) *Attorney, Agent, or Firm* — Dority & Manning, P.A.

(57) ABSTRACT

An electric commercial vehicle power steering system includes an input shaft, an electric motor, and a planetary gear set, a drive coupling, and an output shaft. A first one of a sun gear, a planet carrier, and a ring gear of the planetary gear set is connected to and rotatable with a rotor of the electric motor, and a second one of the sun gear, the planet carrier, and the ring gear of the planetary gear set is connected to and rotatable with a first gear of the drive coupling. A second gear of the drive coupling is connected to and rotatable with the input shaft. A globoidal worm drive is arranged between the input shaft and the output shaft. The globoidal worm drive couples the input shaft to the output shaft such that the output shaft is rotatable with the input shaft via the globoidal worm drive.

16 Claims, 10 Drawing Sheets

ELECTRIC COMMERCIAL VEHICLE POWER STEERING SYSTEM WITH A GLOBOIDAL WORMGEARING

FIELD OF THE INVENTION

The present subject matter relates generally to power steering systems for commercial vehicles.

BACKGROUND OF THE INVENTION

Conventional commercial vehicles generally include hydraulic power steering. Known hydraulic power steering systems include a hydraulic piston actuated by pressurized hydraulic fluid from a pump. A steering wheel and the hydraulic piston are both coupled to a steering linkage, and the pressurized hydraulic fluid from the pump selectively extends and retracts the hydraulic piston to supplement torque applied to the steering linkage by a driver turning the steering wheel.

While known hydraulic power steering systems function well in conventional commercial vehicles, utilizing hydraulic power steering in electric and/or hybrid commercial vehicles poses challenges. An electric commercial vehicle power steering system would be useful.

BRIEF DESCRIPTION OF THE INVENTION

Aspects and advantages of the invention will be set forth in part in the following description, or may be apparent from the description, or may be learned through practice of the invention.

The present subject matter relates generally to an electric power steering system for commercial vehicles. The electric power steering system includes a globoidal wormgearing or double enveloping gearset, which may advantageously assist with proving a suitable mechanical advantage for an electric motor to power steering of heavy commercial vehicles. The globoidal wormgearing may provide such mechanical advantage within a compact package. Thus, the present subject matter may electrify the power steering of heavy commercial vehicles, in a safe, robust, and/or cost-effective manner.

In an example embodiment, an electric commercial vehicle power steering system includes an input shaft and an electric motor. A planetary gear set includes a sun gear, a plurality of planet gears, a planet carrier, and a ring gear. A first one of the sun gear, the planet carrier, and the ring gear of the planetary gear set is connected to and rotatable with a rotor of the electric motor. A drive coupling includes a first gear and a second gear. A second one of the sun gear, the planet carrier, and the ring gear of the planetary gear set is connected to and rotatable with the first gear of the drive coupling. The second gear of the drive coupling is connected to and rotatable with the input shaft. The example electric commercial vehicle power steering system also includes an output shaft. A globoidal worm drive is arranged between the input shaft and the output shaft. The globoidal worm drive couples the input shaft to the output shaft such that the output shaft is rotatable with the input shaft via the globoidal worm drive.

In a first example aspect, the input shaft may extend between a first end portion and a second end portion. The input shaft may form a manual drive interface at the first end portion of the input shaft, and a globoid worm of the globoidal gearing may be positioned proximate the second end portion of the input shaft.

In a second example aspect, the sun gear of the planetary gear set may be connected to and rotatable with the rotor of the electric motor. The planet carrier of the planetary gear set may be connected to and rotatable with the first gear of the drive coupling.

In a third example aspect, the drive coupling may further include a belt or chain that couples the first gear of the drive coupling to the second gear of the drive coupling. As an alternative to the belt or chain, the drive coupling may further include at least one additional gear meshed with the first and second gears of the drive coupling.

In a fourth example aspect, an axis of rotation of the output shaft may be perpendicular to an axis of rotation of the input shaft. An axis of rotation of the rotor of the electric motor may be parallel to the axis of rotation of the input shaft.

In a fifth example aspect, the globoidal worm drive may include a globoid worm meshed with a globoid worm wheel. The globoid worm may be positioned on the input shaft, and the globoid worm wheel may be positioned on the output shaft. The globoid worm wheel may include a plurality of teeth distributed along an arcuate curve no less than one-hundred and twenty degrees and no greater than two-hundred degrees. A pair of bearings may support the input shaft, and the globoid worm may be positioned on the input shaft between the pair of bearings. Each of the pair of bearings may be a tapered roller bearing.

In a sixth example aspect, a commercial vehicle may include the example electric commercial vehicle power steering system. The commercial vehicle may also include a Pitman arm connected to the output shaft, a steering knuckle with a steering arm, and a drag link extending between and connected to the Pitman arm and the steering arm of the steering knuckle. The electric motor of the example electric commercial vehicle power steering system may be operable to turn the steering knuckle.

Each of the example aspects recited above may be combined with one or more of the other example aspects recited above in certain embodiments. For instance, all of the six example aspects recited above may be combined with one another in some embodiments. As another example, any combination of two, three, four, or five of the six example aspects recited above may be combined in other embodiments. Thus, the example aspects recited above may be utilized in combination with one another in some example embodiments. Alternatively, the example aspects recited above may be individually implemented in other example embodiments. Accordingly, it will be understood that various example embodiments may be realized utilizing the example aspects recited above.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
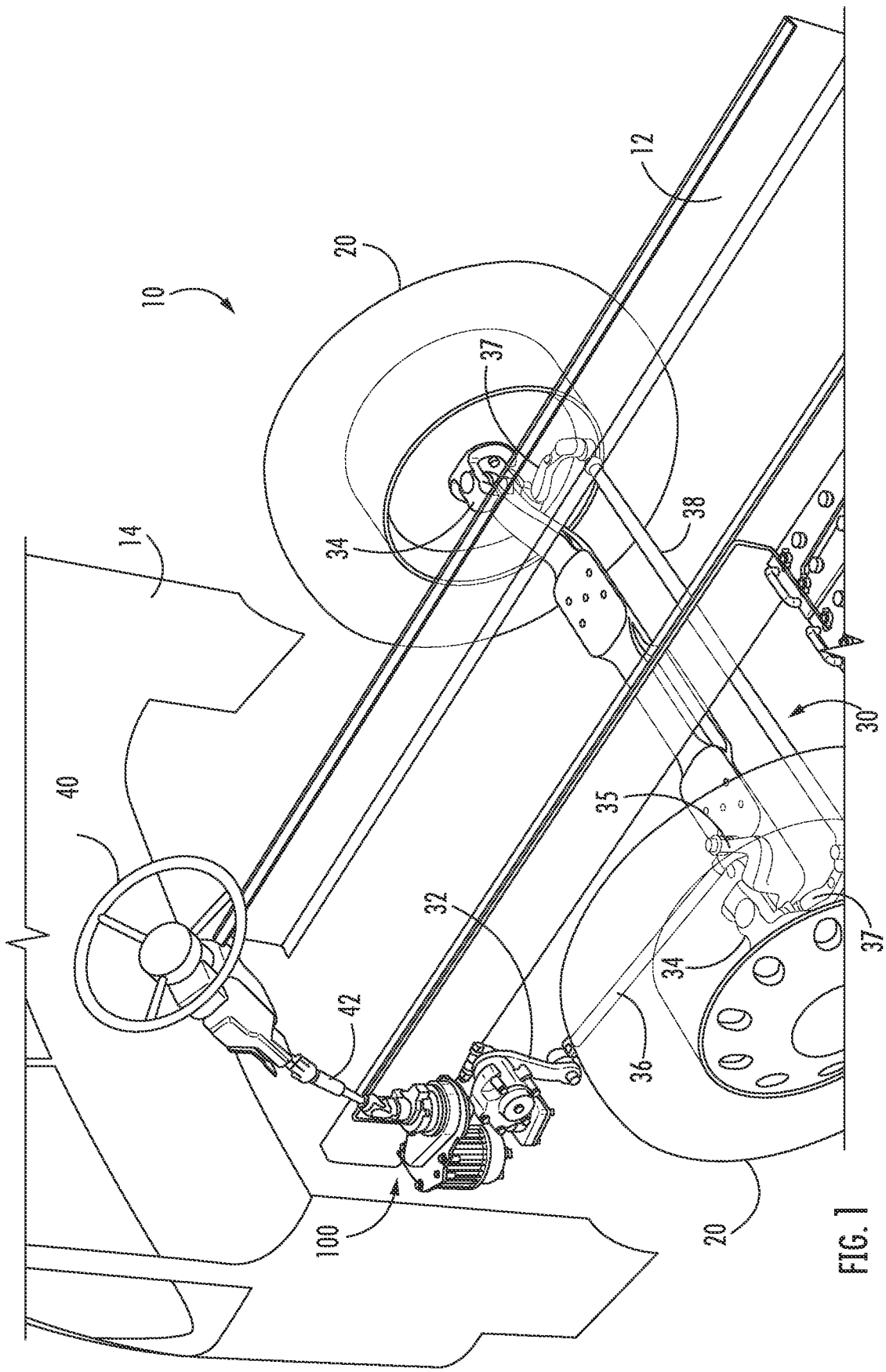
FIG. 1 is a perspective view of an electric commercial vehicle power steering system according to an example embodiment of the present subject matter installed within a commercial vehicle, which is shown schematically.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

Example embodiments of the present disclosure are directed to an electric power steering system for heavy commercial vehicles. The electric power steering system may include a globoidal wormgearing or double enveloping worm gearset. Utilizing the globoidal wormgearing may advantageously provide a mechanical advantage between an electric motor and/or a vehicle handwheel and an output shaft. Moreover, the electric power steering system may provide a mechanically robust, safe, and cost-effective power steering system for heavy commercial vehicles.

FIG. 1 is a perspective view of an electric commercial vehicle power steering system 100 according to an example embodiment of the present subject matter installed within a commercial vehicle 10, which is shown schematically. Various views and components of electric commercial vehicle power steering system 100 are also shown in FIGS. 2 through 10. As discussed in greater detail below, electric commercial vehicle power steering system 100 includes components for providing a mechanical advantage for an electric motor, e.g., to allow the electric motor to supplement torque applied to a steering linkage by a driver turning a steering wheel.

Electric commercial vehicle power steering system 100 may be mounted within commercial vehicle 10, e.g., on a frame 12 of commercial vehicle 10 and/or beneath a cab 14 of commercial vehicle 10. Thus, electric commercial vehicle power steering system 100 is described in greater detail below in the context of commercial vehicle 10, which is generally referred to as a "cab-over" style truck. However, it will be understood that commercial vehicle 10 is provided by way of example only and that electric commercial vehicle power steering system 100 may be used in any suitable commercial vehicle, including "conventional cab" trucks and "cab-beside-engine" trucks. In general, electric commercial vehicle power steering system 100 may be configured for use in or with commercial vehicles sized greater than twenty-six thousand pounds (26,000 lbs.), greater than seven and a half tons (7.5 t.), or other heavy trucks.

With reference to FIGS. 1 through 4, electric commercial vehicle power steering system 100 includes an input shaft 110, an electric motor 120, a planetary gear set 130, a drive coupling 140, an output shaft 150, and a globoidal worm drive 160. Planetary gear set 130, drive coupling 140, and globoidal worm drive 160 may be disposed within a housing 102 of electric commercial vehicle power steering system 100, e.g., which is mountable on frame 12 of commercial vehicle 10. Planetary gear set 130, drive coupling 140, and globoidal worm drive 160 may cooperate and be configured to provide a mechanical advantage for electric motor 120, e.g., to allow electric motor 120 to supplement driver torque applied at input shaft 110 in order to facilitate turning of wheels 20 of commercial vehicle 10, as described in greater detail below.

Input shaft 110 may be coupled to a steering wheel 40 of commercial vehicle 10. For instance, steering wheel 40 may be coupled to input shaft 110 via a steering column 42 of commercial vehicle 10 that extends between and connects steering wheel 40 to input shaft 110, and a driver of commercial vehicle 10 may turn steering wheel 40 to rotate input shaft 110 via steering column 42 that transfers rotation of steering wheel 40 to input shaft 110. Within electric commercial vehicle power steering system 100, input shaft 110 is coupled to output shaft 150 such that the rotation of input shaft 110 is transferred to output shaft 150. Output shaft 150 is coupled to steering linkage 30 such that rotation of output shaft 150 turns wheels 20 of commercial vehicle 10. Thus, rotation of steering wheel 40 by the driver of commercial vehicle 10 may turn wheels 20.

As noted above, electric commercial vehicle power steering system 100 includes features for supplementing the torque applied by the driver to input shaft 110 by turning wheel 20, e.g., in order to make steering of commercial vehicle 10 easier for the driver. In particular, electric motor 120 is operable to drive rotation of input shaft 110, e.g., to supplement the torque applied by the driver to input shaft 110 by turning wheel 20. Electric motor 120 may be coupled to input shaft 110 via planetary gear set 130 and drive coupling 140. Thus, e.g., rotation of electric motor 120 may drive rotation of input shaft 110 via planetary gear set 130 and drive coupling 140.

Figure 2:
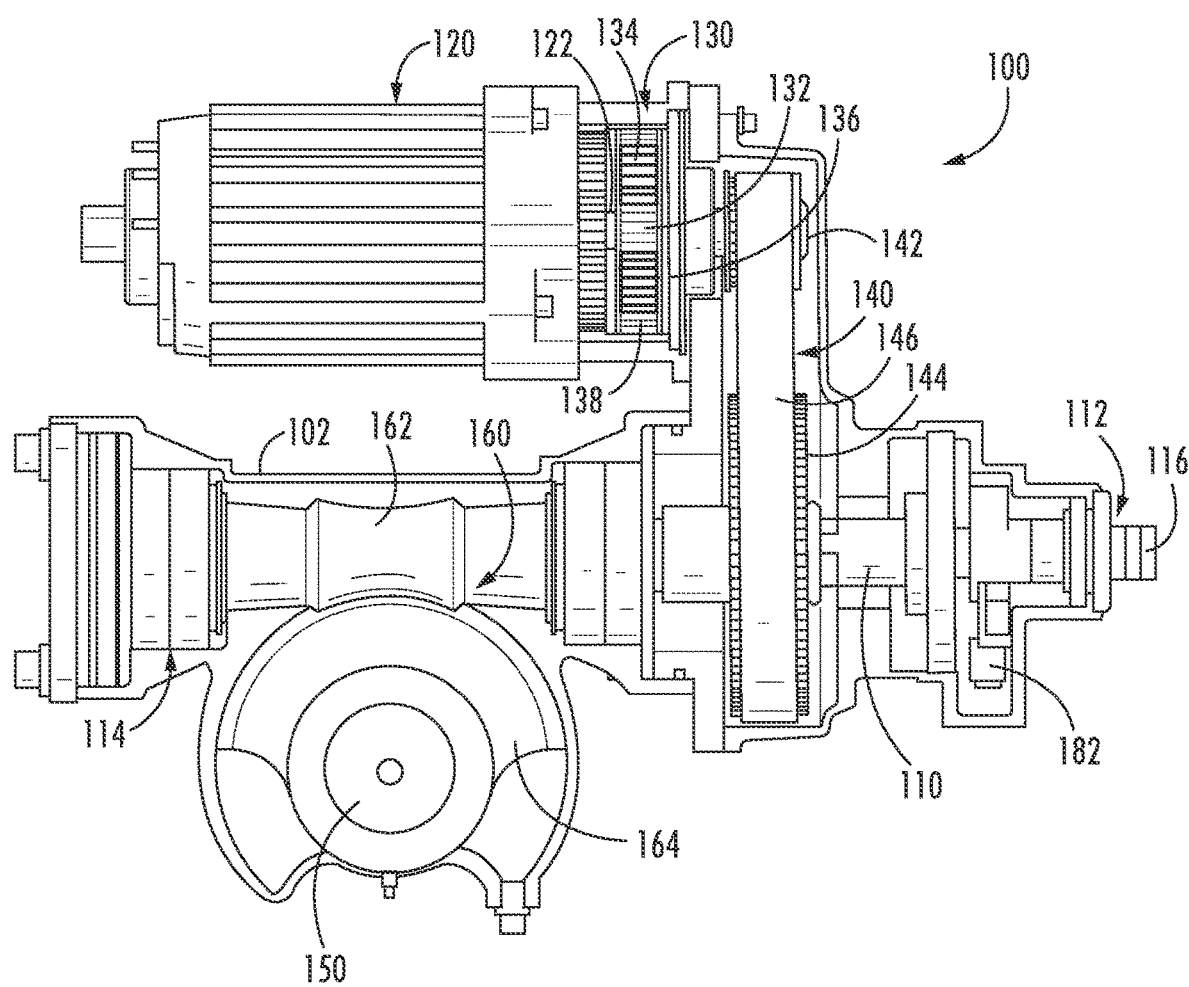
FIG. 2 is a schematic view of the example electric commercial vehicle power steering system of FIG. 1.
Figure 7:
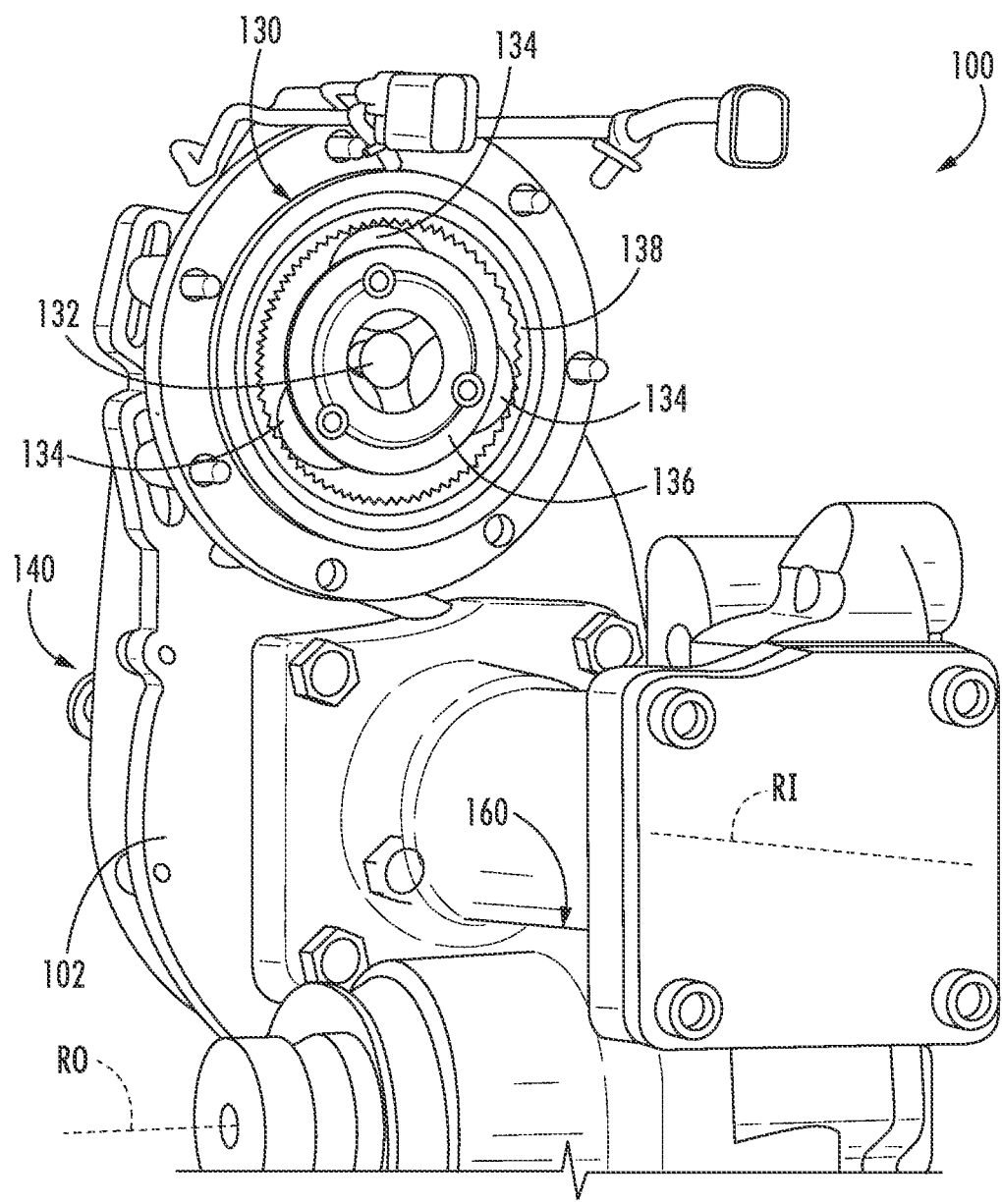
FIG. 7 is another partial, elevation view of certain components of the example electric commercial vehicle power steering system of FIG. 1.

Planetary gear set 130 may be disposed in power flow between electric motor 120 and drive coupling 140. Thus, e.g., planetary gear set 130 may be configured for transferring rotation of electric motor 120 to drive coupling 140. Planetary gear set 130 may include a sun gear 132, a plurality of planet gears 134, a planet carrier 136, and a ring gear 138 (FIGS. 2 and 7). Planet gears 134 are meshed with both sun gear 132 and ring gear 138. Thus, e.g., planet gears 134 may be positioned between sun gear 132 and ring gear 138 within planetary gear set 130. It will be understood that, while planetary gear set 130 has one set of planetary gears 134 and is thus a negative or minus planetary gear set in the illustrated example embodiment, planetary gear set 130 may include an additional set of planetary gears and thus be a positive or plus planetary gear set in alternative example embodiments.

One of sun gear 132, planet carrier 136, and ring gear 138 of planetary gear set 130 may be connected to and be rotatable with a rotor 122 of electric motor 120 (FIG. 2). Thus, e.g., the one of sun gear 132, planet carrier 136, and ring gear 138 of planetary gear set 130 may correspond to an input of planetary gear set 130 during operation of electric motor 120 when windings within electric motor 120 drive rotation of rotor 122. Moreover, the one of sun gear 132, planet carrier 134, and ring gear 138 of planetary gear set 130 may rotate when windings within electric motor 120 drive rotation of rotor 122. In certain example embodiments, sun gear 132 is connected to and rotatable with rotor 122. For instance, sun gear 132 may be integrally formed with rotor 122, e.g., such that the teeth of sun gear 132 are formed on rotor 122. For example, an end of rotor 122 may be milled, ground, hobbed, shaped, or otherwise suitable machined to form sun gear 132 on rotor 122. Alternatively, sun gear 132 may be separately formed and subsequently connected to rotor 122, e.g., directly onto rotor 122 or with one or more intervening elements, such as a shaft.

Figure 5:
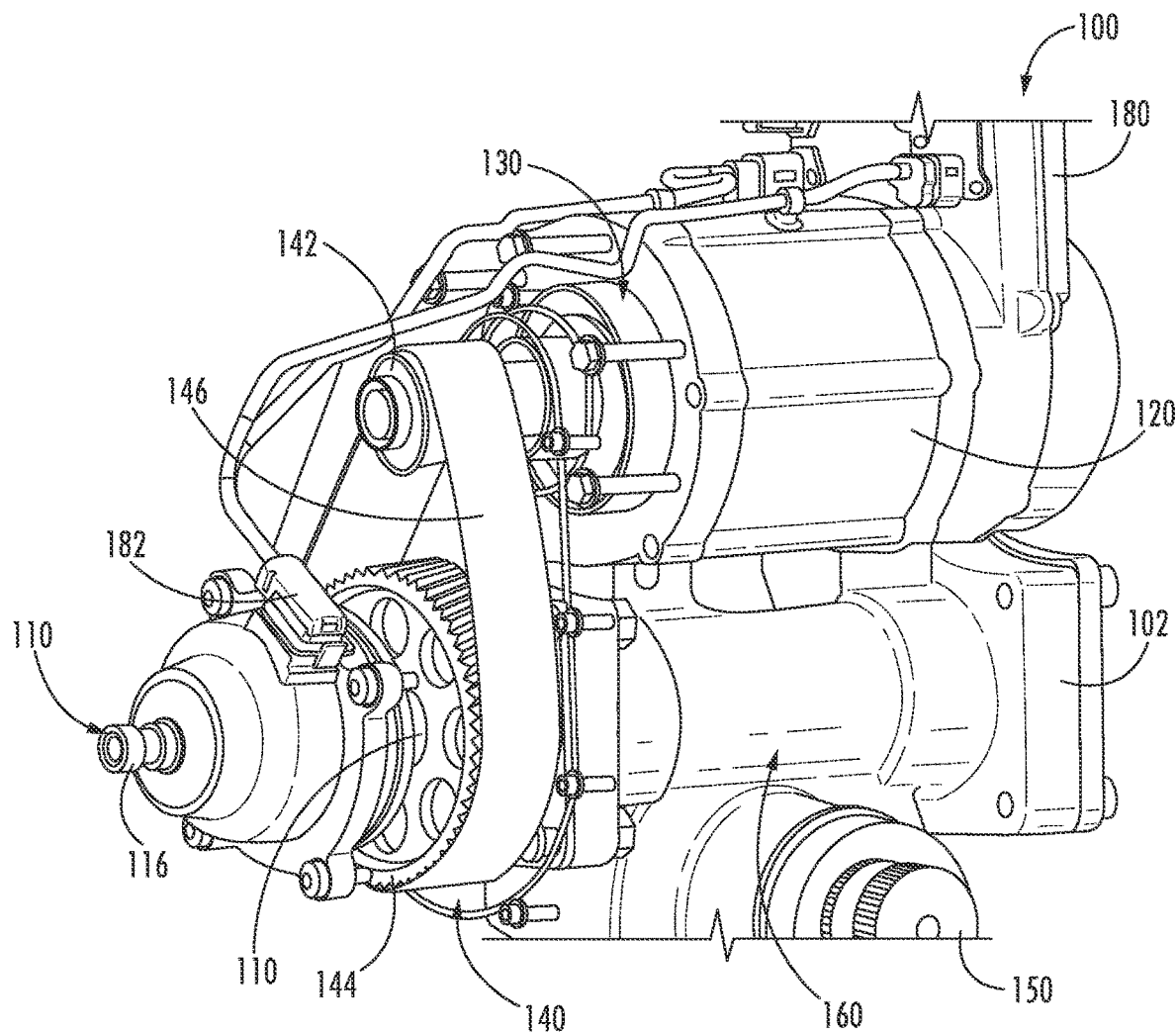
FIG. 5 is a partial, elevation view of certain components of the example electric commercial vehicle power steering system of FIG. 1.
Figure 6:
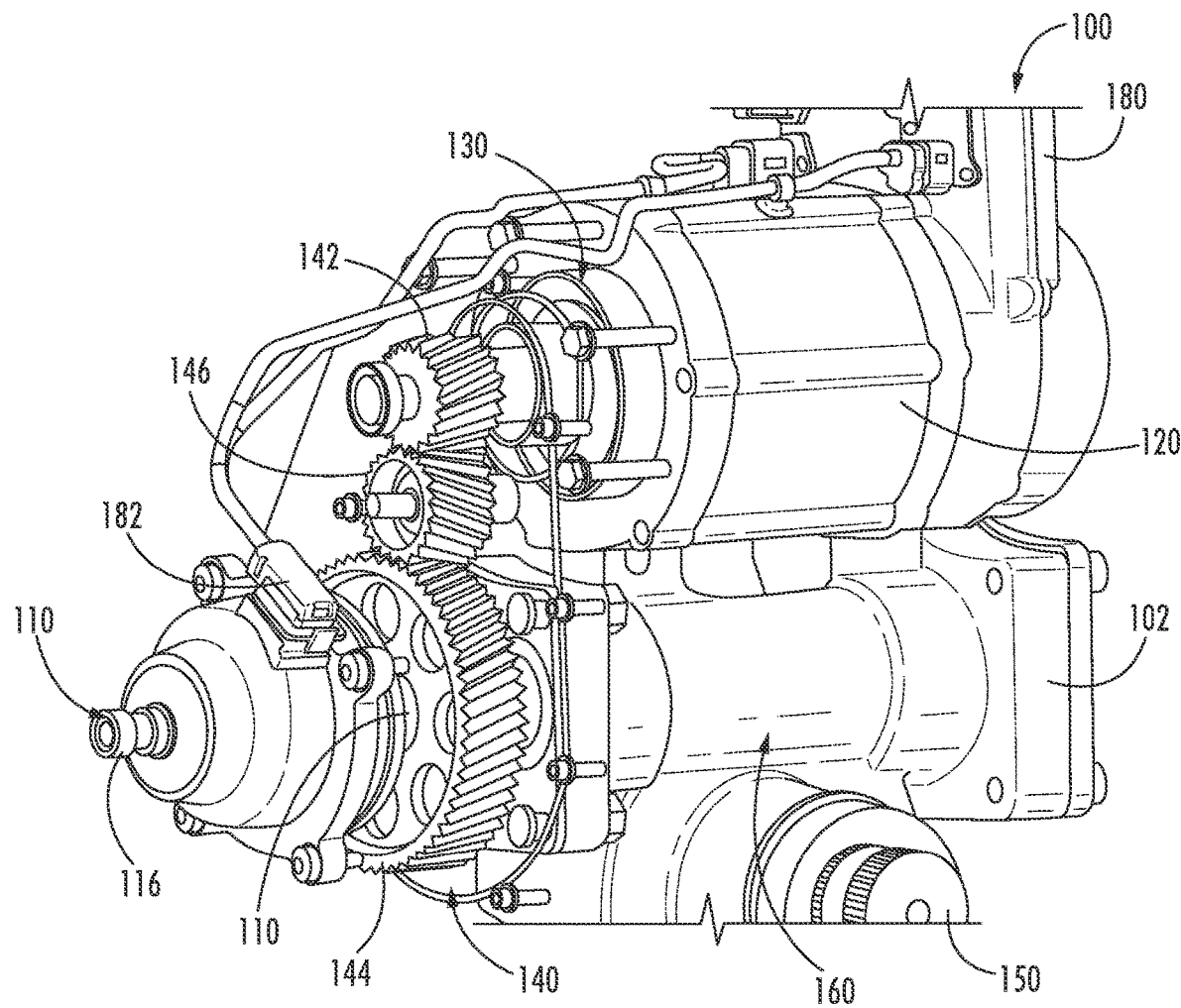
FIG. 6 is a partial, elevation view of certain components of an electric commercial vehicle power steering system according to another example embodiment of the present subject matter.

Drive coupling 140 may be disposed in power flow between planetary gear set 130 and input shaft 110. Thus, e.g., drive coupling 140 may be configured for transferring rotation of an element of planetary gear set 130 to input shaft 110, e.g., and thus transfer rotation of electric motor 120 from planetary gear set 130 to input shaft 110. Drive coupling 140 may include a first gear 142, a second gear 144, and an intermediate element 146 for coupling first and second gears 142, 144 (FIGS. 5 and 6). In the example embodiment shown in FIG. 5, intermediate element 146 is configured as a belt that extends between and connects first and second gears 142, 144 such that rotation of first gear 142 is transferred to second gear 144 via the belt. In alternative example embodiments, the belt may be configured as a chain. In the example embodiment shown in FIG. 6, intermediate element 146 is configured as a third gear that is meshed with first and second gears 142, 144, e.g., to form a gear train, such that rotation of first gear 142 is transferred to second gear 144 via the third gear. In alternative example embodiments, intermediate element 146 may include one or more additional gears forming a gear train between first and second gears 142, 144 in combination with the third gear. As may be seen from the above, drive coupling 140 may be, e.g., a traction drive or a gear train, configured for transferring rotation of electric motor 120 from planetary gear set 130 to input shaft 110.

Another one of sun gear 132, planet carrier 136, and ring gear 138 of planetary gear set 130 (e.g., other than the one of sun gear 132, planet carrier 136, and ring gear 138 connected to and rotatable with rotor 122) may be connected to and be rotatable with first gear 142 of drive coupling 140. Thus, e.g., another one of sun gear 132, planet carrier 136, and ring gear 138 of planetary gear set 130 may correspond to an output of planetary gear set 130 during operation of electric motor 120, and first gear 142 may correspond to an input for drive coupling 140 during operation of electric motor 120. Moreover, the other one of sun gear 132, planet carrier 136, and ring gear 138 of planetary gear set 130 connected to first gear 142 may rotate when windings within electric motor 120 drive rotation of rotor 122. In certain example embodiments, planet carrier 136 is connected to and rotatable with first gear 142. For instance, planet carrier 136 may be connected to first gear 142, e.g., directly or via a suitable shaft or other intermediate components.

Second gear 144 of drive coupling 140 may be connected to and be rotatable with input shaft 110. Thus, e.g., second gear 144 may correspond to an output for drive coupling 140 during operation of electric motor 120. In certain example embodiments, second gear 144 may be welded, fastened, or otherwise fixed to input shaft 110.

As noted above, electric motor 120 may be coupled to input shaft 110 via planetary gear set 130 and drive coupling 140, e.g., such that rotation of electric motor 120 may drive rotation of input shaft 110 via planetary gear set 130 and drive coupling 140. For instance, electric motor 120 may operate to rotate rotor 122, and a first one of the components of planetary gear set 130 (e.g., sun gear 132) may rotate during operation of electric motor 120. The rotation of the first one of the components of planetary gear set 130 (e.g., sun gear 132) may drive rotation of a second one of the components of planetary gear set 130 (e.g., planet carrier 136). Due to the coupling of the second one of the components of planetary gear set 130 (e.g., planet carrier 136) to first gear 142 of drive coupling 140, planetary gear set 130 may transfer rotation of electric motor 120 to drive coupling 140 such that first gear 142 rotates during operation of electric motor 120. In turn, intermediate element 146 may transfer the rotation of first gear 142 to second gear 144 within drive coupling 140, and input shaft 110 may rotate due to the connection of second gear 144 to input shaft 110. Accordingly, input shaft 110 may rotate during operation of electric motor 120, e.g., with a mechanical advantage for electric motor 120 provided by planetary gear set 130 and drive coupling 140.

As described in greater detail below, electric commercial vehicle power steering system 100 also includes features for coupling input shaft 110 to output shaft 150, e.g., such that rotation of input shaft 110 drives rotation of output shaft 150. In particular, globoidal worm drive 160 may be arranged between input and output shafts 110, 150. Globoidal worm drive 160 couples input shaft 110 to output shaft 150 such that output shaft 150 is rotatable with input shaft 110 via globoidal worm drive 160. In particular, when a driver rotates steering wheel 40 and/or when electric motor 120 operates to rotate input shaft 110, globoidal worm drive 160 may transfer rotation of input shaft 110 to output shaft 150.

Globoidal worm drive 160 may include a globoid worm 162 meshed with a globoid worm wheel 164. Globoid worm 162 may correspond to an input for globoidal worm drive 160 during rotation of input shaft 110, e.g., when a driver rotates steering wheel 40 and/or when electric motor 120 operates. Globoid worm 162 may be positioned on input shaft 110. For instance, globoid worm 162 may be integrally formed with input shaft 110. In particular, globoid worm 162 may be machined milled, ground, hobbed, shaped, or otherwise suitably machined to form globoid worm 162 on input shaft 110. As another example, globoid worm 162 may be separately formed and subsequently connected to input shaft 110, e.g., with or without one or more intervening elements, such as a shaft. In certain example embodiments, input shaft 110 may extend between a first end portion 112 and a second end portion 114. Input shaft 110 may form a manual drive interface 116, e.g., at first end portion 112 of input shaft 110. Steering column 42 may be connected to input shaft 110 at manual drive interface 116, e.g., by engaging splines on manual drive interface 116. Globoid worm 162 may be positioned proximate second end portion 114 of input shaft 110. Second gear 144 may be positioned on input shaft between manual drive interface 116 and globoid worm 162.

Globoid worm wheel 164 may be positioned on output shaft 150. Moreover, globoid worm wheel 164 may correspond to an output for globoidal worm drive 160 during rotation of input shaft 110, e.g., when a driver rotates steering wheel 40 and/or when electric motor 120 operates. In certain example embodiments, globoid worm wheel 164 may be welded, fastened, or otherwise fixed to output shaft 150.

Figure 8:
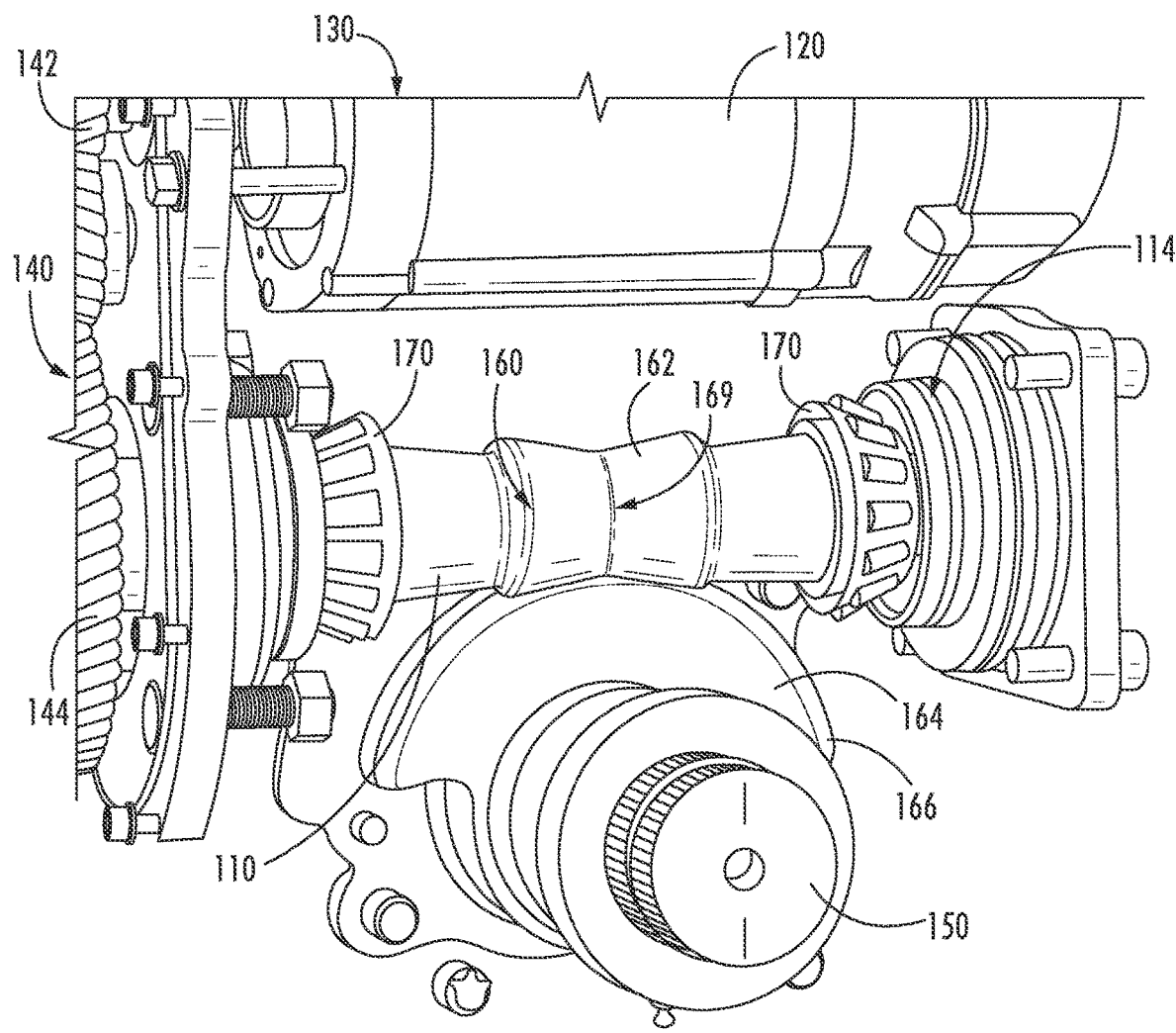
FIG. 8 is a partial, perspective view of a globoidal worm drive of the example electric commercial vehicle power steering system of FIG. 1.
Figure 9:
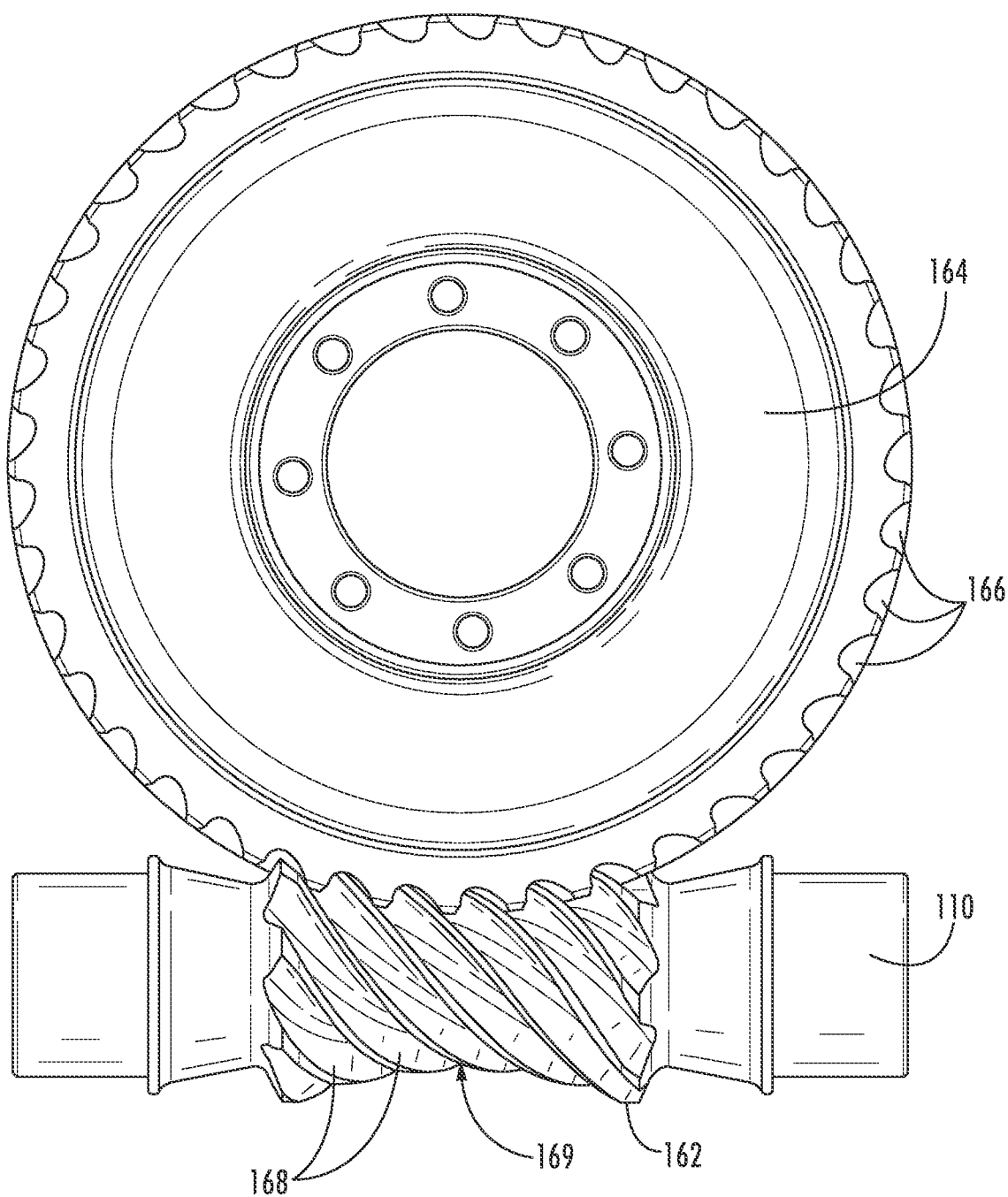
FIGS. 9 and 10 are respective views of a globoidal worm drive of an electric commercial vehicle power steering system according to another example embodiment of the present subject matter.
Figure 10:
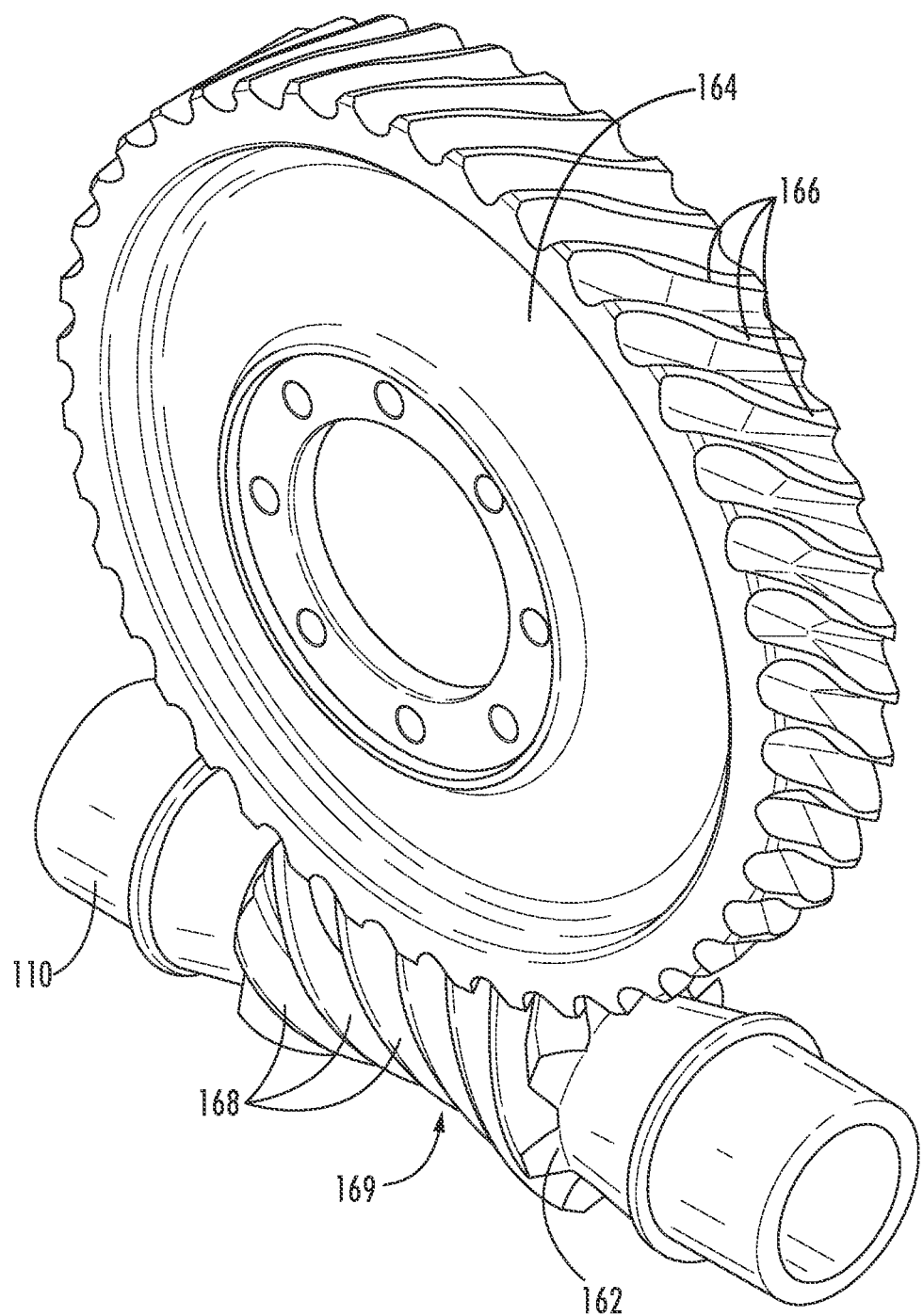

With reference to FIG. 8, globoid worm wheel 164 may include a plurality of teeth 166, and teeth 166 of globoid worm wheel 164 may distributed along an arcuate curve no less than one-hundred and twenty degrees (120°) and no greater than two-hundred degrees (200°). Thus, teeth 166 of globoid worm wheel 164 may be arcuately distributed, and the remainder of globoid worm wheel 164 may not include teeth that mesh with globoid worm 162. In such example embodiments, globoid worm wheel 164 may be a section gear and may be lighter than alternative a circular globoid worm wheel 164 with teeth distributed in a circular pattern, e.g., as shown in FIGS. 9 and 10.

Globoid worm 162 may also include one or more teeth 168. Teeth 168 of globoid worm 162 may increase in diameter from a middle portion 169 of globoid worm 162 towards both ends of globoid worm 162. Teeth 166 of globoid worm wheel 164 may throated, e.g., such that a groove is defined at distal ends of teeth 166 of globoid worm wheel 164, e.g., that complements the shape of teeth 168 of globoid worm 162. Thus, globoidal worm drive 160 may also be referred to as a double-enveloping worm drive.

Electric commercial vehicle power steering system 100 may also include a pair of bearings 170, which support input shaft 110. For instance, bearings 170 may be tapered roller bearings, e.g., that support radial and/or axial loads from input shaft 110 on housing 102. Globoid worm 162 may be positioned on input shaft 110 between bearings 170.

As noted above, electric motor 120 may be coupled to input shaft 110 via planetary gear set 130 and drive coupling 140, e.g., such that rotation of electric motor 120 may drive rotation of input shaft 110 via planetary gear set 130 and drive coupling 140. In addition, globoidal worm drive 160 couples input shaft 110 to output shaft 150 such that output shaft 150 is rotatable with input shaft 110 via globoidal worm drive 160. Thus, e.g., when a driver rotates steering wheel 40 and/or when electric motor 120 operates to rotate input shaft 110, globoidal worm drive 160 may transfer rotation of input shaft 110 to output shaft 150. In particular, globoid worm 162 may rotate when input shaft 110 rotates, and rotation of globoid worm 162 may drive rotation of globoid worm wheel 164 and output shaft 150. Accordingly, output shaft 150 may rotate during operation of electric motor 120. Electric motor 120 may be reversible to drive rotation of output shaft 150 in both positive and negative directions (e.g., according to the right-hand rule).

To control operation of electrical motor 120, electric commercial vehicle power steering system 100 may include a controller 180 and/or a power steering sensor 182. Controller 180 may include a memory and microprocessor, such as a general or special purpose microprocessor operable to execute programming instructions or micro-control code associated with operation of electric commercial vehicle power steering system 100. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 180 may be constructed without using a microprocessor, e.g., using a combination of discrete analog and/or digital logic circuitry (such as switches, amplifiers, integrators, comparators, flip-flops. AND gates, and the like) to perform control functionality instead of relying upon software. Electric motor 120 and power steering sensor 182 may be in communication with controller 180 via one or more signal lines or shared communication busses. Controller 180 may also communication with other systems within commercial vehicle 10 via a controller area network (CAN) bus.

Power steering sensor 182 may be configured for detecting a steering torque and/or angle of input shaft 110. In response to inputs from power steering sensor 182, controller 180 may operate electric motor 120 to drive rotation of output shaft 150. Moreover, power steering sensor 182 may detect a driver of commercial vehicle 10 turning steering wheel 40, and controller 180 may activate electric motor 120 to supplement driver torque applied at input shaft 110 in order to facilitate turning of wheels 20 of commercial vehicle 10. Further, power steering sensor 182 may detect the direction and the degree to which the driver turns steering wheel 40, and controller 180 may operate electric motor 120 to drive rotor 122 a certain number of rotations in a certain direction, both of which complement detected direction and degree from power steering sensor 182.

Figure 4:
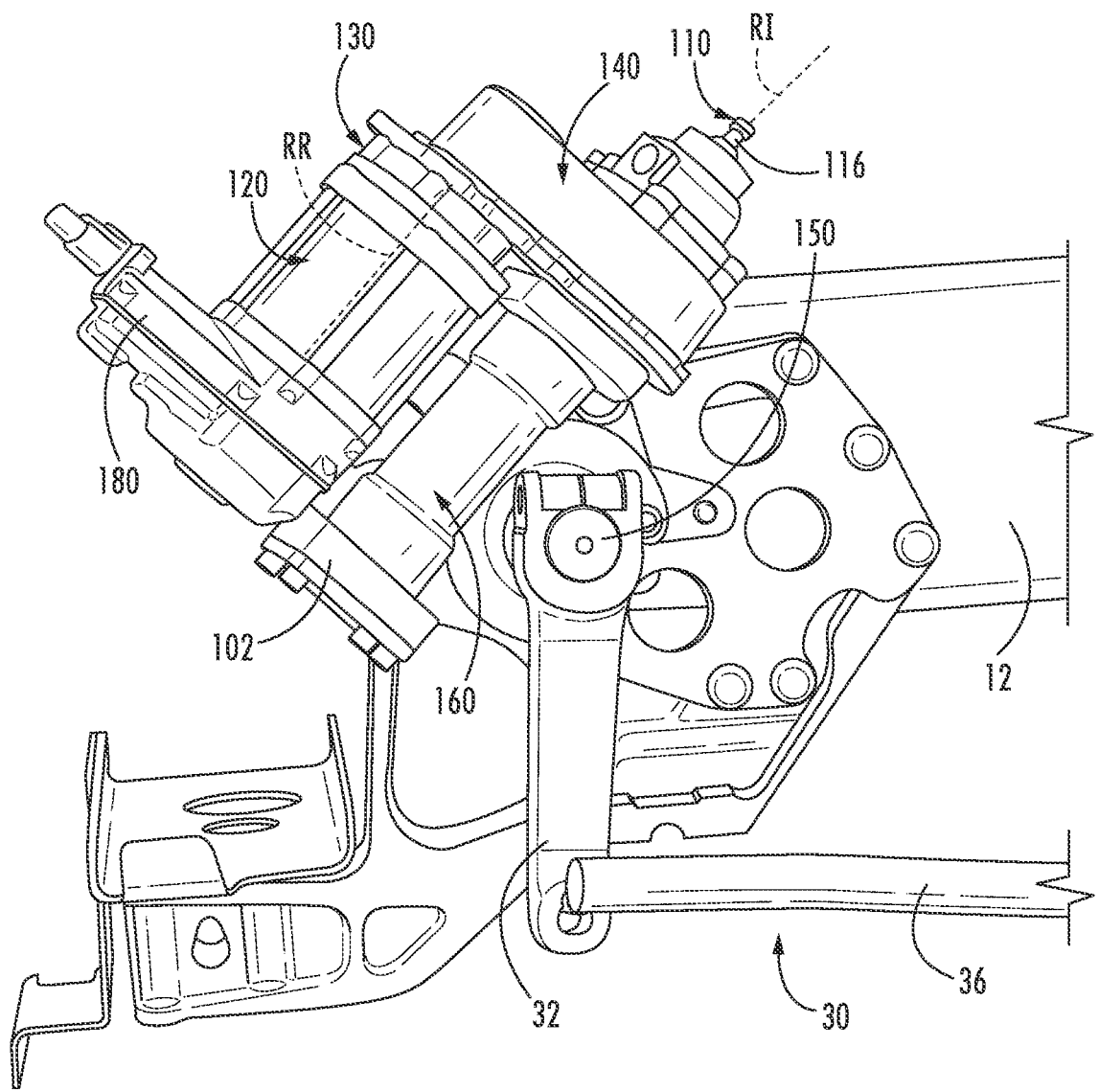
FIG. 4 is a side elevation view of the example electric commercial vehicle power steering system of FIG. 1 installed on a frame of the commercial vehicle.

With reference to FIGS. 1 and 4, output shaft 150 may be coupled to steering linkage 30 of commercial vehicle 10. For instance, steering linkage 30 may include a Pitman arm 32, a steering knuckles 34, a drag link 36, Ackermann arms 37, and a tie rod 38. Pitman arm 32 may be connected to output shaft 150. Drag link 36 may extend between and be connected to Pitman arm 32 and a steering arm 35 of steering knuckle 34. For instance, a proximal end of Pitman arm 32 may be mounted to output shaft 150, and drag link 36 may be connected to Pitman arm 32 at a distal end of Pitman arm 32. Tie rod 38 may extend between and connect Ackermann arms 37 of both steering knuckles 34 in order to couple steering knuckles 34 together. Electric motor 120 may be operable to turn steering knuckles 34 and thus wheels 20 of commercial vehicle 10. For instance, by rotating output shaft 150, electric motor 120 may pivot Pitman arm 32 and thus rotate steering knuckles 34. Thus, electric motor 120 may be operable to supplement driver torque applied at input shaft 110 in order to facilitate turning of wheels 20 of commercial vehicle 10.

Figure 3:
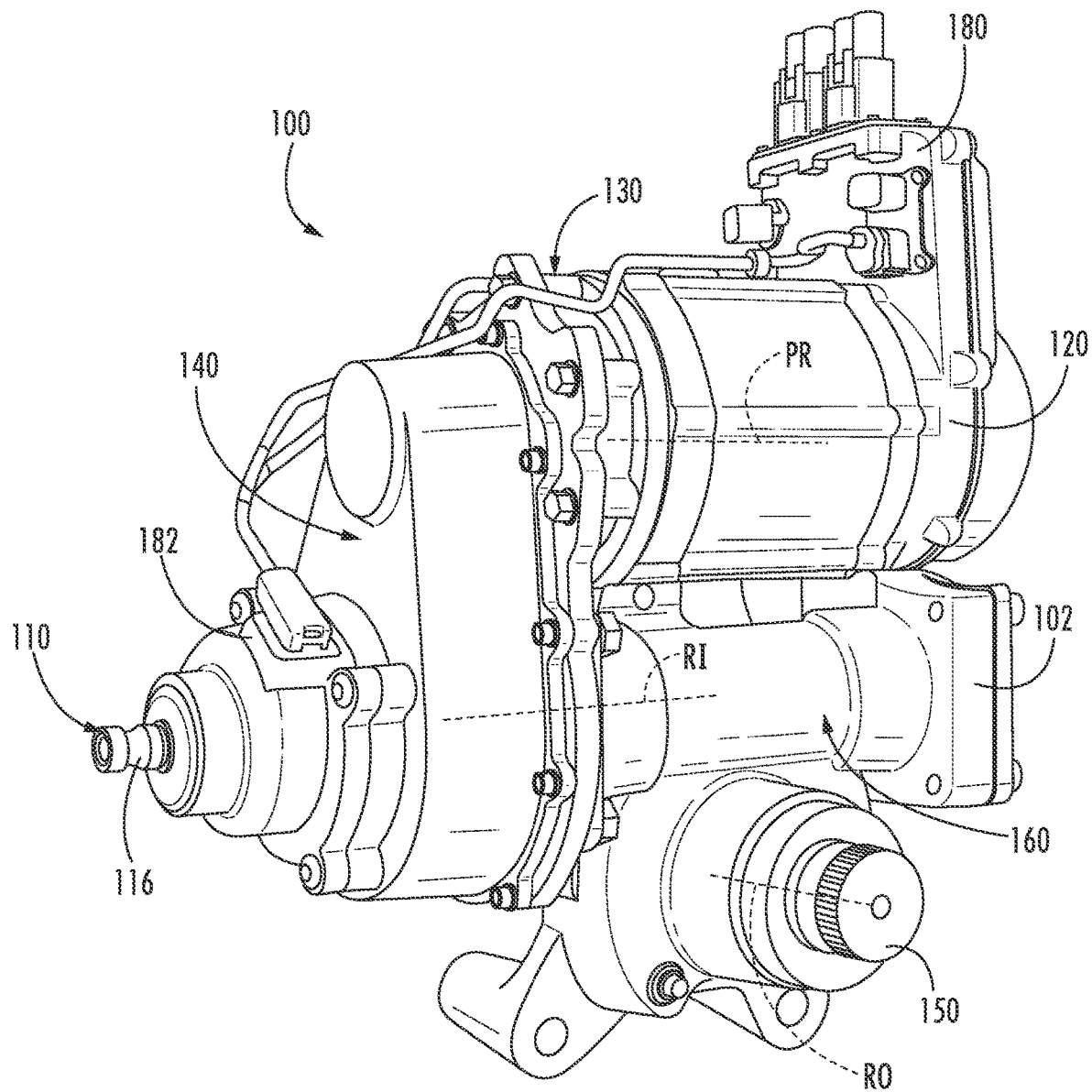
FIG. 3 is a perspective view of the example electric commercial vehicle power steering system of FIG. 1.

With reference to FIG. 3, in certain example embodiments, an axis of rotation RO of output shaft 150 may be perpendicular to an axis of rotation RI of input shaft 110. As used herein the term "perpendicular", means about ninety degrees (90°), e.g., within three degrees (3°) of such angle. An axis of rotation RR of rotor 122 may be parallel to the axis of rotation RI of input shaft 110. As used herein the term "parallel", means no more than three degrees (3°) is defined between the two axes. Such orientations may facilitate a compact arrangement of electric commercial vehicle power steering system 100.

As may be seen from the above, electric commercial vehicle power steering system 100 includes components (e.g., planetary gear set 130, drive coupling 140, and globoidal worm drive 160) for mechanical reduction between electrical motor 120 and/or steering wheel 40 and output shaft 150, e.g., to convert the low torque and high speed of electric motor 120 into useful higher torque and low speed to effectively steer a heavy commercial vehicle. As an example, planetary gear set 130, drive coupling 140, and globoidal worm drive 160 may collectively provide a mechanical advantage of about 335:1 for electric motor 120 to rotate output shaft 150, e.g., the mechanical advantage may be no less than 300:1 and no greater than 350:1. It will be understood that the mechanical advantage between electric motor 120 and output shaft 150 may be selected based upon characteristics of electric motor 120, such as torque, speed, acceleration, etc. Thus, e.g., when the torque output of electric motor 120 is relatively high and with enough speed and acceleration, electric commercial vehicle power steering system 100 may be configured to provide a relatively low mechanical advantage between electric motor 120 and output shaft 150 via planetary gear set 130, drive coupling 140, and globoidal worm drive 160. Conversely, e.g., when the torque output of electric motor 120 is relatively low and with enough speed and acceleration, electric commercial vehicle power steering system 100 may be configured to provide a relatively high mechanical advantage between electric motor 120 and output shaft 150 via planetary gear set 130, drive coupling 140, and globoidal worm drive 160.

Electric commercial vehicle power steering system 100 may provide a mechanical robust, safe and cost-effective electric power steering system for heavy commercial vehicles. Moreover, electric commercial vehicle power steering system 100 may advantageously: (1) electrify the power steering of heavy commercial vehicles; (2) provide the required mechanical advantage for an electric motor to steer heavy commercial vehicles; (3) provide a compact power steering system; (4) provide a robust and safe electric power steering system for heavy commercial vehicles; and/or (5) provide a cost-effective electric steering system for heavy duty commercial vehicles.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

LIST OF REFERENCE CHARACTERS

10 Commercial vehicle
12 Frame
14 Cab
20 Wheels
30 Steering linkage
32 Pitman arm
34 Steering knuckle
36 Drag link
37 Ackermann arm
38 Tie rod
40 Steering wheel
42 Steering column
100 Electric commercial vehicle power steering system
102 Housing
110 Input shaft
112 First end portion
114 Second end portion
116 Manual drive interface
120 Electric motor
122 Rotor
130 Planetary gear set
132 Sun gear
134 Planet gears
136 Planet carrier
138 Ring gear
140 Drive coupling
142 First gear
144 Second gear
146 Intermediate element
150 Output shaft
160 Globoidal worm drive
162 Globoid worm
164 Globoid worm wheel
166 Teeth
168 Teeth
169 Middle portion
170 Bearings
180 Controller
182 Power steering sensor
RO Axis of rotation
RI Axis of rotation
RR Axis of rotation

What is claimed is:

1. An electric commercial vehicle power steering system, comprising:
   a housing;
   an input shaft rotatable within the housing;
   an electric motor mounted to the housing;
   a planetary gear set disposed within the housing and comprising a sun gear, a plurality of planet gears, a planet carrier, and a ring gear, a first one of the sun gear, the planet carrier, and the ring gear of the planetary gear set is connected to and rotatable with a rotor of the electric motor;
   a drive coupling disposed within the housing and comprising a first gear and a second gear, a second one of the sun gear, the planet carrier, and the ring gear of the planetary gear set is connected to and rotatable with the first gear of the drive coupling, and the second gear of the drive coupling is connected to and rotatable with the input shaft, the drive coupling further comprising a belt or chain coupling the first gear of the drive coupling to the second gear of the drive coupling;
   an output shaft rotatable within the housing;
   a globoidal worm drive disposed within the housing and arranged between the input shaft and the output shaft, the globoidal worm drive coupling the input shaft to the output shaft such that the output shaft is rotatable with the input shaft via the globoidal worm drive,
   a Pitman arm connected to the output shaft;
   a steering knuckle with a steering arm; and a drag link extending between and connected to the Pitman arm and the steering arm of the steering knuckle, wherein the input shaft extends between a first end portion and a second end portion, the input shaft forms a manual drive interface at the first end portion of the input shaft, and a globoid worm of the globoidal gearing is positioned on the input shaft proximate the second end portion of the input shaft, wherein the input shaft is connectable to a steering column at the manual drive interface such that the input shaft is rotatable via the steering column, and wherein the electric motor of the electric commercial vehicle power steering system is operable to turn the steering knuckle.

2. The electric commercial vehicle power steering system of claim 1, wherein the sun gear of the planetary gear set is connected to and rotatable with the rotor of the electric motor.

3. The electric commercial vehicle power steering system of claim 2, wherein the planet carrier of the planetary gear set is connected to and rotatable with the first gear of the drive coupling.

4. The electric commercial vehicle power steering system of claim 1, wherein an axis of rotation of the output shaft is perpendicular to an axis of rotation of the input shaft.

5. The electric commercial vehicle power steering system of claim 4, wherein an axis of rotation of the rotor of the electric motor is parallel to the axis of rotation of the input shaft.

6. The electric commercial vehicle power steering system of claim 1, wherein the globoidal worm drive comprises a globoid worm meshed with a globoid worm wheel, the globoid worm is positioned on the input shaft, and the globoid worm wheel is positioned on the output shaft.

7. The electric commercial vehicle power steering system of claim 6, wherein the globoid worm wheel comprises a plurality of teeth distributed along an arcuate curve no less than one-hundred and twenty degrees and no greater than two-hundred degrees.

8. The electric commercial vehicle power steering system of claim 6, further comprises a pair of bearings supporting the input shaft, wherein the globoid worm is positioned on the input shaft between the pair of bearings.

9. The electric commercial vehicle power steering system of claim 8, wherein each of the pair of bearings is a tapered roller bearing.

10. A commercial vehicle comprising the electric commercial vehicle power steering system of claim 1.

11. The electric commercial vehicle power steering system of claim 1, wherein the manual drive interface comprises a plurality of splines.

12. An electric commercial vehicle power steering system, comprising:
a housing;
an input shaft rotatable within the housing;
an electric motor mounted to the housing;
a planetary gear set disposed within the housing and comprising a sun gear, a plurality of planet gears. a planet carrier, and a ring gear a first one of the sun gear, the planet carrier. and the ring gear of the planetary gear set is connected to and rotatable with a rotor of the electric motor;
a drive coupling disposed within the housing and comprising a first gear and a second gear. a second one of the sun gear, the planet carrier and the ring gear of the planetary gear set is connected to and rotatable with the first gear of the drive coupling, and the second gear of the drive coupling is connected to and rotatable with the input shaft, the drive coupling further comprising at least one additional gear meshed with the first and second gears of the drive coupling;
an output shaft rotatable within the housing;
a globoidal worm drive disposed within the housing and arranged between the input shaft and the output shaft. the globoidal worm drive coupling the input shaft to the output shaft such that the output shaft is rotatable with the input shaft via the globoidal worm drive,
a Pitman arm connected to the output shaft;
a steering knuckle with a steering arm; and
a drag link extending between and connected to the Pitman arm and the steering arm of the steering knuckle,
wherein the input shaft extends between a first end portion and a second end portion, the input shaft forms a manual drive interface at the first end portion of the input shaft, and a globoid worm of the globoidal gearing is positioned on the input shaft proximate the second end portion of the input shaft
wherein the input shaft is connectable to a steering column at the manual drive interface such that the input shaft is rotatable via the steering column, and
wherein the electric motor of the electric commercial vehicle power steering system is operable to turn the steering knuckle.

13. An electric commercial vehicle power steering system, comprising:
a housing;
an input shaft rotatably mounted within the housing;
an electric motor mounted to the housing;
a planetary gear set disposed within the housing, the planetary gear set comprising a sun gear, a plurality of planet gears, a planet carrier, and a ring gear, the sun gear of the planetary gear set connected to and rotatable with a rotor of the electric motor;
a drive coupling disposed within the housing, the drive housing comprising comprising a first gear and a second gear, the planet carrier of the planetary gear set connected to and rotatable with the first gear of the drive coupling, the second gear of the drive coupling connected to and rotatable with the input shaft, the drive coupling further comprising at least one additional gear meshed with the first and second gears of the drive coupling;
an output shaft rotatably mounted within the housing ;
a globoidal worm drive disposed within the housing, the globoidal worm drive comprising a globoid worm meshed with a globoid worm wheel, the globoid worm positioned on the input shaft, the globoid worm wheel positioned on the output shaft;
a Pitman arm connected to the output shaft;
a steering knuckle with a steering arm; and
a drag link extending between and connected to the Pitman arm and the steering arm of the steering knuckle,
wherein the electric motor of the electric commercial vehicle power steering system is operable to turn the steering knuckle.

14. The electric commercial vehicle power steering system of claim 13, wherein the globoid worm wheel comprises a plurality of teeth distributed along an arcuate curve no less than one-hundred and twenty degrees and no greater than two-hundred degrees.

15. The electric commercial vehicle power steering system of claim 13, further comprises a pair of bearings supporting the input shaft, wherein the globoid worm is positioned on the input shaft between the pair of bearings.

16. An electric commercial vehicle power steering system, comprising:
- a housing;
- an input shaft rotatably mounted within the housing;
- an electric motor mounted to the housing;
- a planetary gear set disposed within the housing, the planetary gear set comprising a sun gear, a plurality of planet gears, a planet carrier, and a ring gear the sun gear of the planetary gear set connected to and rotatable with a rotor of the electric motor;
- a drive coupling disposed within the housing, the drive housing comprising comprising a first gear and a second gear, the planet carrier of the planetary gear set connected to and rotatable with the first gear of the drive coupling, the second gear of the drive coupling connected to and rotatable with the input shaft, the drive coupling further comprising a belt or chain coupling the first gear of the drive coupling to the second gear of the drive coupling;
- an output shaft rotatably mounted within the housing;
- a globoidal worm drive disposed within the housing, the globoidal worm drive comprising a globoid worm meshed with a globoid worm wheel, the globoid worm positioned on the input shaft, the globoid worm wheel positioned on the output shaft:
- a Pitman arm connected to the output shaft:
- a steering knuckle with a steering arm; and
- a drag link extending between and connected to the Pitman arm and the steering arm of the steering knuckle,
- wherein the electric motor of the electric commercial vehicle power steering system is operable to turn the steering knuckle.

* * * * *